(No Model.) 2 Sheets—Sheet 1.

H. MALMBERG.
TWO WHEELED VEHICLE.

No. 382,175. Patented May 1, 1888.

Attest.
C. W. H. Brown,
John W. Suggett.

Inventor:
Hjalmar Malmberg.

N. PETERS, Photo-Lithographer, Washington, D. C.

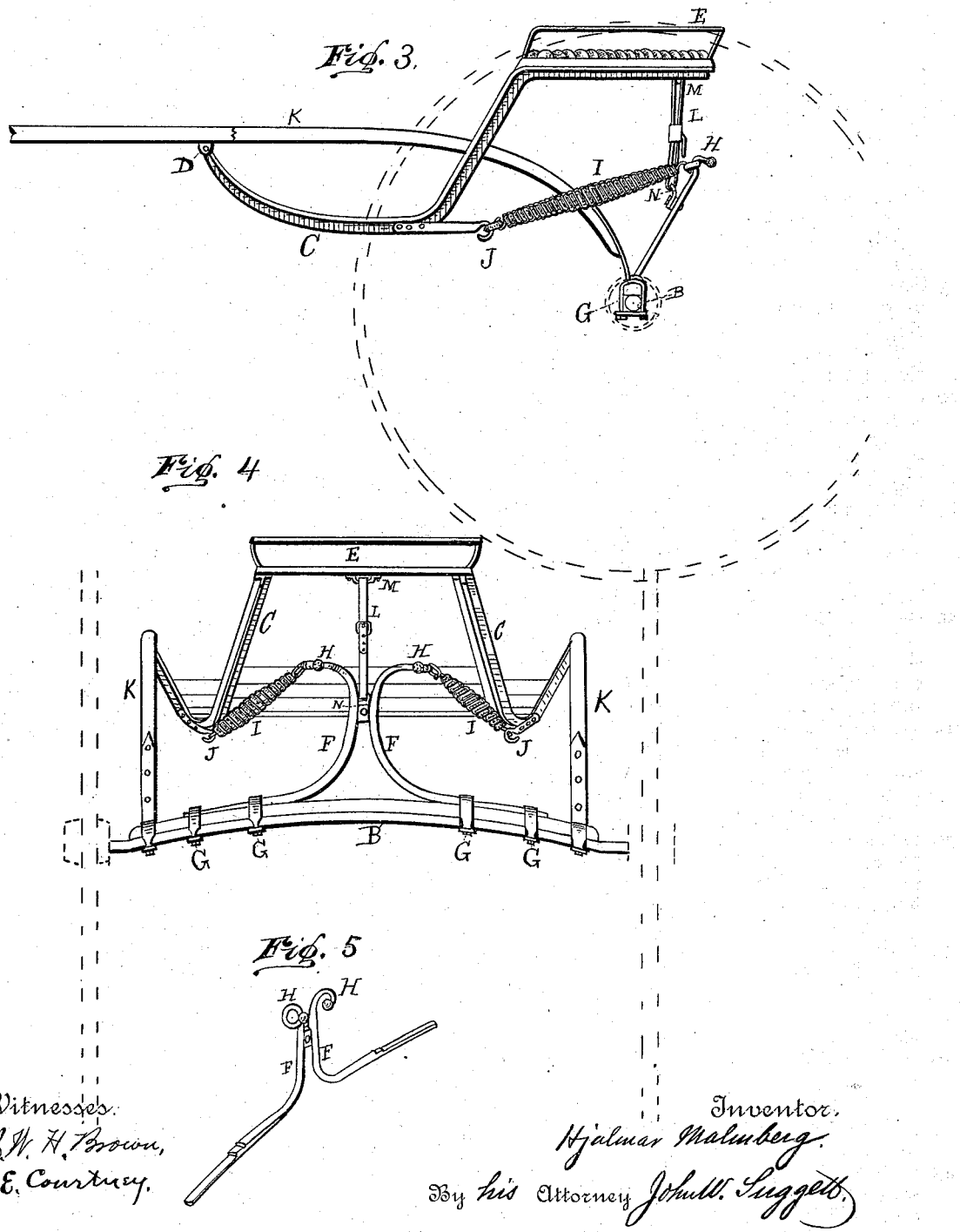

UNITED STATES PATENT OFFICE.

HJALMAR MALMBERG, OF CORTLAND, NEW YORK.

TWO-WHEELED VEHICLE.

SPECIFICATION forming part of Letters Patent No. 382,175, dated May 1, 1888.

Application filed September 16, 1887. Serial No. 249,850. (No model.)

*To all whom it may concern:*

Be it known that I, HJALMAR MALMBERG, a citizen of the United States, residing at the village of Cortland, county of Cortland, and State of New York, have invented a new and useful Improvement in Two-Wheeled Vehicles, of which the following is a specification.

The invention relates to that class of vehicles, commonly called "carts" or "sulkies," in which the body or seat is partially situated over the axle, and the bars, supporting the body or seat, attached at their forward ends to the thills or the thill cross-bar by means of a working-joint.

The object of the invention is to place or locate the springs of the vehicle substantially under the seat or body thereof by attaching one end of each spring to a suitable standard or standards projecting up from the axle of the vehicle and suspending said springs in an outward and forward direction and attaching the other end to the seat-bars, seat-frame, or body of the vehicle. By this method of arranging and placing the springs, so as to bring the weight of the load mostly and substantially over the springs, all violent action of said springs is reduced to a minimum, and an easy and pleasant riding cart or sulky is produced.

The invention consists in the peculiar arrangement and combination of the various parts, as will be hereinafter more fully described in the specification, and specifically pointed out in the claims.

Figure 1:
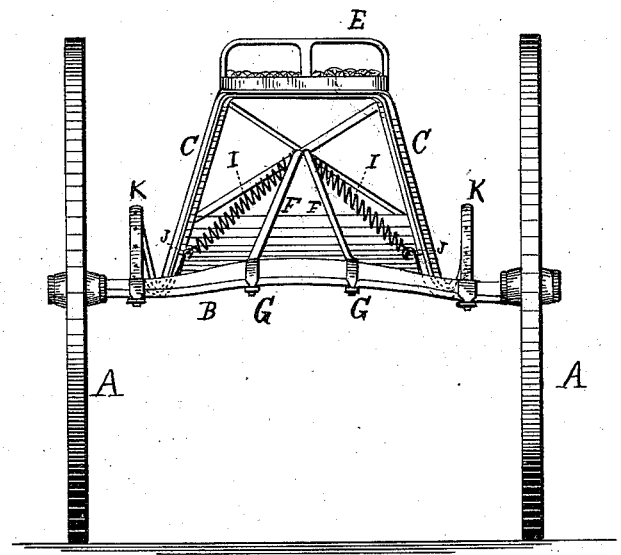
Figure 2:
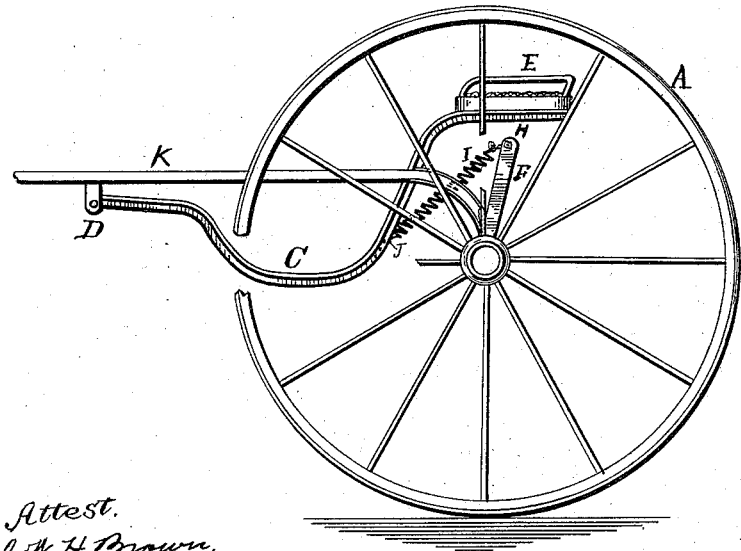

In the accompanying drawings, Figure 1 represents a rear view of a sulky or cart with my invention applied thereto, showing the hooks of the standard substantially close together; Fig. 2, a side view of the same; Fig. 3, a side view of a portion of a cart or sulky with one of the thills removed, showing more clearly the seat bar or frame, the projecting standard and its hook, and the coiled spring and its attachment to the standard and seat-bar; Fig. 4, a rear elevation of the same, showing the springs in bracing position and with the top of the standard or standards somewhat extended apart. Fig. 5 is a perspective view of the standard or standards.

Similar letters refer to similar parts throughout the several views.

Referring to the drawings, A indicates the wheels of the vehicle, (shown in dotted or broken lines in Figs. 3 and 4,) and B the axle thereof.

C indicates the seat-bars or seat-frame, which is pivoted or attached to the thills of the vehicle by means of the working-joint D, and E the seat supported upon the seat-frame C.

Rigidly secured to the axle by the clips G is the standard or standards F, which may be made in one piece, as shown in Figs. 4 and 5, or entirely separated, as shown in Figs. 1 and 2; but the form shown in Figs. 4 and 5 is much the preferred, as it possesses greater strength and durability. The top ends of the standard or standards are each provided with a hook, H, and may be slightly inclined toward each other, coming substantially close together, as shown in Fig. 1, or diverging, as shown in Fig. 4. The arrangement of the standard or standards on the axle is such that the top end or ends thereof will be inclined in a rear direction until parallel with the back of the seat or seat-frame, sufficient space being left between said ends and the seat for the latter, when loaded, to have free play up and down without striking or interfering with the standards.

Attached to each hook H is one end of a coiled spring, I, the other end being attached to a hook, J, on the seat bars or frame. These springs may be made of any suitable metal of sufficient strength to withstand the strain to which they will be subjected, and at the same time possess such flexibility as will impart a sensitive and pleasant spring motion. I prefer to make them of steel, and of sufficient length to be readily and quickly placed in position. It will be noticed that each spring extends in an outward and at the same time a forward direction from the hook H until it reaches the hook J, where it is attached. This peculiar arrangement of the springs forms an important feature of my invention, as by it, it will be at once seen, these springs serve as braces to the seat-frame by preventing the lateral or swaying movement of the body or frame that is usual in sulkies or carts where the springs are attached to the seat-bars and thills, respectively.

K indicates the thills or shafts rigidly secured to the axle, and L the usual leather tension strap, passing through the loops M and N, respectively, for the purpose of tensioning the springs to prevent the seat from rising or sticking up when unloaded, and also to prevent the rattling of said springs in their hooks.

Various changes and modifications of the different parts may be made without departing from the spirit of my invention or sacrificing the advantages thereof—as, for instance, the standard or standards, instead of being clipped to the axle, may be bolted or secured to the same by any of the well-known means employed by carriage-builders; or the coiled springs may be attached to the end or ends of the standard or standards by any of the well-known connecting devices other than the hooks H and J; but the latter are preferred, because of their adaptability for permitting the springs to be readily and quickly removed and replaced, thus enabling a lighter spring to be substituted for a heavier one, and vice versa, according to the weight of the load to be carried.

It is well known to the trade that many disadvantages arise from attaching the coiled springs to the thills and seat-bars, the principal one of which is the great strain on the springs, due to the leverage produced by the weight of the load and the nearness of the springs to the front end of the seat-frame. Another disadvantage is a tendency to unseat the rider, which is caused by the quick and reflex action of the springs when passing over obstructions at a high rate of speed. Still another disadvantage arises from the constant action of the springs in response to the motion of the thills when the horse is traveling. All of these disadvantages I overcome by locating the springs, as much as possible, directly under the load, and attaching them in the manner shown and described. I do not, however, wish to be understood as limiting myself to any particular form or style of standard or standards, but to claim, broadly, any form of standard or standards projecting upward from and in the same parallel plane with the axle, and having the end or ends approximately close together. In no case should said ends be so far separated that the springs will lose the bracing action which steadies the seat-frame against lateral movement.

Having thus fully described my invention, what I claim as new, and desire to secure by Letters Patent, is—

1. In a two-wheel vehicle, the combination of a standard or standards projecting upward from the axle and having the ends approximately close together, and two springs, one end of each attached to the upper end of said standard or standards and the other end attached to each side bar of the frame, substantially as specified.

2. In a two-wheel vehicle, the combination, with a standard or standards, rigidly secured to the axle and projecting upwardly and rearwardly, of two coiled springs located beneath the seat and having their respective ends attached to the upper end of the standard or standards and to the seat-frame, substantially as specified.

3. In a two-wheel vehicle, the combination, with a standard or standards, rigidly secured to the axle and projecting upwardly and rearwardly at a suitable distance below the seat, of two coiled springs, one end of each spring attached to the upper end of the standard or standards and the other end extending in an outward and forward direction and attached to the seat-frame, substantially as specified.

4. The combination of the seat-frame hinged to the thills of a vehicle, the thills rigidly secured to the axle, the standard or standards rigidly secured to the axle and projecting upward with the ends approximately close together and provided with hooks H, and the coiled springs, one end of each secured to the hook H and the other end to a hook, J, on the side bars of the frame, substantially as specified.

HJALMAR MALMBERG.

Witnesses:
JOHN W. SUGGETT,
P. H. WHITING.